US012318843B2

(12) United States Patent
Üstüner et al.

(10) Patent No.: US 12,318,843 B2
(45) Date of Patent: Jun. 3, 2025

(54) METHOD FOR HEAT TREATING AN OBJECT CONTAINING AT LEAST ONE RARE-EARTH ELEMENT WITH A HIGH VAPOR PRESSURE

(71) Applicant: Vacuumschmelze GmbH & Co KG, Hanau (DE)

(72) Inventors: Kaan Üstüner, Hanau (DE); Matthias Katter, Hanau (DE); Christoph Brombacher, Hanau (DE); Daniela Benedikt, Hanau (DE)

(73) Assignee: Vacuumschmelze GmbH & Co KG, Hanau (DE)

( * ) Notice: Subject to any disclaimer, the term of this patent is extended or adjusted under 35 U.S.C. 154(b) by 0 days.

(21) Appl. No.: 18/616,562

(22) Filed: Mar. 26, 2024

(65) Prior Publication Data

US 2024/0261856 A1 Aug. 8, 2024

Related U.S. Application Data

(63) Continuation of application No. 17/709,498, filed on Mar. 31, 2022, now Pat. No. 11,945,033.

(30) Foreign Application Priority Data

Mar. 31, 2021 (DE) ......................... 102021108241.2

(51) Int. Cl.
*B22F 7/08* (2006.01)
*C22C 19/07* (2006.01)
(Continued)

(52) U.S. Cl.
CPC ................ *B22F 7/08* (2013.01); *C22C 19/07* (2013.01); *H01F 1/055* (2013.01);
(Continued)

(58) Field of Classification Search
CPC .. B22F 7/08; B22F 2301/155; B22F 2201/00; B22F 2301/45; B22F 2303/15;
(Continued)

(56) References Cited

U.S. PATENT DOCUMENTS 4,002,508 A * 1/1977 Haberer ................ C22C 1/0441 420/435
5,382,303 A 1/1995 Anderson et al.
6,696,015 B2 * 2/2004 Tokuhara ............ H01F 41/0253 419/57

FOREIGN PATENT DOCUMENTS

DE 102020113223 A1 11/2020

OTHER PUBLICATIONS

Kamoshita Tsuyoshi et al. [JPH03110386] (text from Machine Translation and Fig from original) (Year: 1991).*

* cited by examiner

*Primary Examiner* — Brian D Walck
*Assistant Examiner* — Nazmun Nahar Shams
(74) *Attorney, Agent, or Firm* — Dickinson Wright PLLC

(57) ABSTRACT

A method is provided for the heat treatment of an object comprising at least one rare-earth element with a high vapor pressure. One or more objects comprising at least one rare-earth element with a high vapor pressure are arranged in an interior of a package. An external source of the at least one rare-earth element is arranged so as to compensate for the evaporation of this same rare-earth element from the object and/or to increase the vapor pressure of the rare-earth element in the interior of the package, and the package is heat treated.

18 Claims, 8 Drawing Sheets

(51) Int. Cl.
*H01F 1/055* (2006.01)
*H01F 41/02* (2006.01)

(52) U.S. Cl.
CPC ...... *H01F 41/0253* (2013.01); *B22F 2201/00* (2013.01); *B22F 2301/155* (2013.01); *C22C 2202/02* (2013.01)

(58) Field of Classification Search
CPC .......... B22F 3/10; B22F 3/1007; C22C 19/07; C22C 2202/02; H01F 1/055; H01F 1/053
See application file for complete search history.

| Jr'(mT) | Variant A | Variant B | Variant C |
|---|---|---|---|
| corner-sample | 899 | 1105 | 1119 |
| middle sample | 1072 | 1113 | 1120 |
| corner sample | 1063 | 1108 | 1113 |

METHOD FOR HEAT TREATING AN OBJECT CONTAINING AT LEAST ONE RARE-EARTH ELEMENT WITH A HIGH VAPOR PRESSURE

This U.S. continuation patent application claims priority to U.S. patent application Ser. No. 17/709,498, filed Mar. 31, 2022, which claims priority to DE Patent Application No. 10 2021 108 241.2, filed Mar. 31, 2021, the entire contents of which are incorporated herein by reference in its entirety.

BACKGROUND

1. Technical Field

The invention relates to a method for heat treating an object containing at least one rare-earth element with a high vapor pressure.

2. Related Art

During heat treatment of objects the composition of the objects may change owing, for example, to undesirable reactions with compounds from the environment such as oxygen and atmospheric humidity. These reactions can adversely affect the properties of the object. NdFeB- and SmCo-based permanent magnets and magnetocaloric LaFeSi-based moulded parts can be produced using a powder-metallurgical method in which a green body made of a compacted powder is heat treated or sintered at high temperatures. However, the rare-earth elements in these alloys exhibit a high reactivity that should be taken into account when handling and sintering green bodies made of these alloy powders containing rare-earth elements if unwanted reactions are to be avoided. For example, there is a risk of the green bodies reacting with the air and absorbing impurities such as oxygen, nitrogen and water vapor during transport between the forming stage and the sintering furnace or during storage between these two process steps. In the sintering furnace there is a risk that organic components, which may be present in the objects as a result of the powder-metallurgical production process and have initially been expelled at low temperatures and so deposited on cold parts of the sintering furnaces, will re-diffuse back onto the parts at higher temperatures and result in unwanted carbon contamination of the sintered objects. Moreover, the composition of the object may also change due to the partial evaporation of a component of the object. This occurs particularly with objects that contain rare-earth elements with a high vapor pressure.

U.S. Pat. No. 5,382,303 discloses a method for the production of a $Sm_2Co_{17}$-based magnet in which the samarium content is increased in order to compensate for samarium losses during the sintering process. However, more accurate and more reliable methods for setting the composition of the sintered magnet are desirable.

SUMMARY

An object of the invention is therefore to provide a method for the sintering of alloys containing rare-earth elements with which the composition of the alloy and the desired properties can be reliably controlled.

The invention provides a method for the heat treatment of an object containing at least one rare-earth element with a high vapor pressure. One or more objects containing at least one rare-earth element with a high vapor pressure are arranged in an interior of a package. An external source of the at least one rare-earth element is arranged so as to compensate for the evaporation of this same rare-earth element from the object and/or to increase the vapor pressure of the rare-earth element in the interior of the package, and the package is heat treated.

The object may, for example, contain at least one of the elements from the group consisting of Sm, Dy, Er, Eu and Yb. These rare-earth elements have high vapor pressures.

In some embodiments the object contains an SmCo alloy that is heat treated in order to produce a $Sm_2Co_{17}$- or $Sm_1Co_5$-type magnet.

The external source is arranged externally to and separate from the object or objects. It may be arranged in the interior volume of the package and/or adjacent to the interior volume of the package in which the object or objects are located. For example, a multi-layered package can be provided, and the external source can be arranged in the interior and/or between the layers of the package. The rare-earth element may, for example, be provided in the form of a powder and/or by coating the inside of the package with a paste. In some embodiments the external source contains at least 0.04 wt % (weight percent) of the rare-earth element based on the total weight of the object or objects.

In addition the objects to be heat treated, one or more further sources of the rare-earth element are thus arranged inside the sinter package in order to achieve the most consistent rare-earth element vapor pressure possible in the interior during heat treatment. This heat treatment may be a sintering process and the object or objects may be green bodies. This consistent vapor pressure enables the content of the rare-earth element in the object to be controlled. Losses of the rare-earth element with the high vapor pressure may occur during heat treatment due to evaporation from the surface of the object. These losses are prevented or reduced by the additional source, which is external to the object or objects. Since the properties of the object are dependent on the rare-earth element content, this improves the quality of the object. For example, the magnetic properties of high-value $Sm_2Co_{17}$ magnets with high iron contents are dependent on samarium concentration. The use of the additional external source containing samarium in the package during the sintering process improves the quality and, in particular, the magnetic properties of the $Sm_2Co_{17}$ magnets.

Due to the high vapor pressure of the rare-earth element, some of the rare-earth element may escape due to unavoidable leaks in the package. If the materials used for the sinter package react with the vapor and form intermetallic phases, as is the case with iron and samarium, for example, some of the rare-earth element will be bound up in these reactions. Even if the sinter package is fully impermeable, this process results in the redistribution of the rare-earth element and to the depletion of the surface of the magnets. In the case of samarium no reaction takes place with a sinter package made of molybdenum since molybdenum does not form intermetallic phases with samarium. In fact, molybdenum acts almost like a mirror for samarium. However, molybdenum is very expensive. The method disclosed in the invention therefore permits a more cost-effective material such as iron, for example, to be used since it compensates for losses due to a samarium-iron reaction. In addition to the sinter blanks, one or more further samarium sources are thus arranged inside the sinter package in order to achieve the most consistent samarium vapor pressure possible.

Here, the additional source of the rare-earth element with the high vapor pressure, e.g. samarium, may be provided in various forms. In an embodiment a powder such as a getter powder containing samarium, for example, is used. Package materials pre-conditioned with samarium vapor and/or the coating of the sintering equipment with a samarium hybrid paste can also be used. In some embodiments the external source contains at least 0.04 wt % of the rare-earth element based on the total weight of the one or more objects. The source containing samarium may also act as a getter for oxygen, carbon and nitrogen. Alternatively, an additional getter for oxygen, carbon and nitrogen may be used to determine the composition more accurately and to further improve the magnetic properties of the magnet.

In some embodiments the package is subjected to heat treatment at a temperature above 1000° C. The type of heat treatment depends, inter alia, on the composition of the object and the desired properties.

In the production of $Sm_2Co_{17}$-based magnets a sintering process featuring alternating heat treatment as described in DE 10 2020 113 223 A1 can be used.

In some embodiments the external source is arranged on the inside of the package. For example, a layer of powder containing the rare-earth element may be applied to the inside of the package. This layer may be applied to the inside of the package by means of spraying, jetting, printing, dipping and/or painting.

In some embodiments in which the rare-earth element is samarium the external source contains a samarium hybrid.

In some embodiments the package comprises an iron foil and/or an iron plate and/or a trough made of iron and/or a canister made of iron. The object or objects can be arranged on the plate or in the trough, and the foil then is wound around the objects and the plate or trough such that the objects and the plate or trough are encased in the iron foil. The iron foil can be used in order to form a canister from the foil.

In some embodiments the external source is provided by an alloy of iron and the rare-earth element on the inside of the package and/or on an additional iron plate. In some embodiments this alloy of iron and the rare-earth element is formed by heat treating the iron foil and/or the iron plate in an atmosphere containing the rare-earth element, the iron and the rare-earth element reacting, and the alloy thus being formed on the surface of the iron foil and/or iron plate.

In some embodiments the package further comprises a support or retaining structure for the objects and the objects are arranged in the support structure.

In some embodiments the support structure contains iron, and the external source is provided by an alloy of iron and the rare-earth element formed on the surface of the support structure by heat treating the support structure in an atmosphere containing the rare-earth element. A layer of a powder containing the rare-earth element may be applied to the support structure by means of spraying and/or jetting and/or dipping and/or painting and/or printing, for example.

In some embodiments the support structure comprises a plurality of plates that are stacked one on cover of another and held spaced apart from one another by means of supporting frames. At least one plate may have at least one recess for receiving an object.

In some embodiments the package comprises a lower box having a base, walls that surround the base, and an open side, and an upper box having a base, walls that surround the base, and an open side. The one or more objects containing at least one rare-earth element with a high vapor pressure are arranged on the base of the lower box and covered with the upper box such that the open side of the upper box faces the base of the lower box, and the walls of the upper box are arranged on the base of the lower box, thereby forming an interior. The external source of the rare-earth element is arranged in the interior. For example, the inside of the upper box and/or the inside of the base of the lower box is occupied by an external source of the rare-earth element. A gap is thus formed between the walls of the upper box and the walls of the lower box, a powder material then being introduced into the gap.

The objects or parts to be heat treated are first placed centrally in a box-shaped lower sinter box that is open at the top and can also be called a trough. A second, upper sinter box that is also box-shaped, is open at the bottom and can also be called a hood is then placed over the objects. The outer lateral dimensions of this second box are smaller than the inner lateral dimensions of the first box. This arrangement results in a closed interior in which the objects are enclosed on all sides. A gap is formed between the two boxes and the powder material is introduced into this gap.

The air path between the objects or the interior and the environment is thus at least partially blocked or sealed by the powder material and gases or volatile compounds from the environment therefore need to travel a longer path to the interior. As a result, the penetration of these gases and compounds into the interior can be reduced, a reaction with the objects can be prevented or at least reduced and the desired properties of the objects can be achieved more reliably. Since the walls of the upper box are arranged on the base of the lower box, the walls of this lower box, which run upwards, surround the walls of the upper box, which run downwards, thereby forming a ring-shaped gap that serves as a ring-shaped container with a base in which the powder material can be received and held.

At the same time, since there is still an air path and the interior is not fully sealed against the environment, any unwanted volatile components such as organic residues, moisture, oxygen and carbon dioxide present in the objects or on the surfaces of the objects can also be pumped out of the interior so as not to adversely affect the properties of the objects.

In a further embodiment the package comprises a plate, a box having a base, walls that surround the base, the base having a hole, and a cover. The plate is arranged on the base of the box, and the one or more objects containing at least one rare-earth element with a high vapor pressure are arranged on the plate. The cover is set on the walls, an interior thus being formed, and a gap being created between the plate and the base of the box beneath the plate. The external source of the rare-earth element is arranged in the interior and a powder material is introduced into the gap.

For example, the powder material is first arranged on the base of the box, the plate is then arranged on the powder material and the objects are arranged on the plate. The external source can be set on the plate and/or on the inside of the box and/or on the cover and/or on a support structure for the objects. The cover is then fastened to the walls in a gas-tight manner. The only gas exchange between the interior and the environment takes places via the powder material and the hole in the base of the box.

These packages are suitable for the heat treatment, e.g. the sintering, of objects such as green bodies that contain one or more rare-earth elements with high reactivity. The package also prevents the loss of volatile rare-earth elements such as samarium und dysprosium during sinter treatment due to evaporation at above approx. 900° C. since the powder material also provides a mechanical obstacle to the escape of components of the objects with a high vapor pressure such as samarium and dysprosium escaping from the interior into the environment. As a result, the sinter package provided permits the conventional charging of the sintering furnace with air without the green bodies of alloys containing rare-earth elements taking up a significant quantity of oxygen and air humidity. The sinter package also prevents the further absorption of impurities such as oxygen, carbon and nitrogen from the environment during the sinter treatment.

These measures result in an improvement in heat treatment performance. Moreover, the improved sinter package obviates the need to acquire costly, fully encapsulated transport systems between the forming stage and the sintering furnace. Finally, and specifically in the case of SmCo magnets, it is also possible using the new sinter package to produce new qualities that meet particularly stringent requirement sin terms of rare-earth element content and contamination levels.

Both boxes are preferably fully gas-tight as far as the missing cover or base area. This ensures that the only gas exchange between the inside of the sinter package and the environment takes place by means of the diffusion of gases through the powder material.

In some embodiments the powder material consists of an inert material, e.g. a ceramic such as $Al_2O_3$, and serves exclusively as a mechanical obstacle to gas exchange. In some embodiments the powder material functions not only as a mechanical obstacle to gas exchange, but also as an active material, e.g. a getter. In such cases, the powder material in the gap serves as a getter bed.

Due to the high reactivity of the powder or getter powder, impurities are effectively bound by oxygen, water vapor, nitrogen and carbon-containing gases. At the same time, the loose filling of getter powder permits the evacuation of the box required for the exchange of process gases such as hydrogen and argon. When sintering alloys containing samarium or dysprosium the getter powder preferably contains samarium or dysprosium. In addition to the getter effect, these elements in the getter bed result in an increased vapor pressure that effectively counters the evaporation of these elements from the surface of the sinter blanks.

The powder material may have a mean grain size of less than 500 μm. The mean grain size may be selected so as to set the flow resistance of the bulk powder and, in case of an active getter, the getter effect.

There are no major requirements here in terms of the fit between the two boxes since they are substantially sealed by the bulk powder. The powder can also be pressed into the gap using a suitable tool in order to prevent cavities in the bulk getter. The powder material can also be bedded in with a suitable inert solvent, which can then be pumped out again before sintering.

In an embodiment the powder material is introduced into the gap, i.e. the walls of the upper box are first arranged on the lower box, the objects and one or more external sources of the rare-earth element thus being enclosed in the interior by the boxes, and the powder material is then introduced into the gap between the walls of the upper and lower boxes. This sequence has the advantage of making it easier to arrange the powder material separately from the objects.

In some embodiments a separating agent intended to prevent the parts from sintering together during heat treatment is optionally scattered on the base of the lower box. The parts to be sintered are placed on this separating agent and covered with the second box that is open at the bottom. The powder material can then be poured onto the upper inner box, from where it can be distributed comfortably in the gap.

In some embodiments the powder material comprises a plurality of different components. For example, a first fraction of the powder may be an inert material, while a second fraction of the powder may be another material such as a reactive material, e.g. an oxygen getter. The powder material may also comprise a fraction of samarium-containing powder such as samarium hybrid, for example. These components may be arranged in layers.

In an embodiment a lower layer of the powder material contains a material containing samarium, and an upper layer contains a reactive material. The reactive material may be an oxygen getter. The oxygen getter used may be an activated carbon or a metal powder. Suitable metal powders include aluminium, magnesium and calcium, for example.

In some embodiments the base, the walls and the seams between the base and the walls of the lower box and of the upper box are gas-tight. These embodiments prevent gases escaping from and penetrating into the interior via paths that lie outside the powder material. This makes the powder material more effective.

In some embodiments the package is set up outside the furnace and then transported into the furnace. In this arrangement, the powder material in the gap between the inside of the walls of the lower box and the outside of the walls of the upper box prevents air from penetrating into the interior during transport.

In some embodiments the upper and lower boxes are made of iron, e.g. an iron foil, or of a molybdenum or alloyed high-temperature steel. These materials are heat-resistant at high temperatures and can be formed into box shapes that also have gas-tight seams.

For commercial production a plurality of objects is usually arranged in an assembly and heat treated simultaneously. In some embodiments the assembly also has a support structure for the objects, and the objects are arranged in the support structure. Typically, the support structure is arranged on the base of the lower box, the objects are arranged in the support structure and the upper box is then arranged on the lower box.

In an embodiment the support structure comprises a plurality of plates that are stacked one on top of the other and held spaced apart from one another by supporting frames. At least one plate may have at least one recess for receiving an object.

In an embodiment the support structure is formed from a corrugated sheet. This sheet may be made of iron or molybdenum, for example, and be bent in order to produce the corrugated form.

In some embodiments the gap filled with the powder material may also be covered with a frame and/or a cover. The frame may be arranged in the gap and, in some embodiments, directly on the powder material. The additional cover may, for example, be set on the open side of the lower box and may, for example, be crimped to the lower box, the open end of the gap being covered by the additional cover. The cover of the upper box is also covered by this additional cover. A combination of a frame in the gap and an additional cover on the open side of the lower box can also be used.

The additional cover can be used to prevent the getter powder in the gap from being stirred up during transport, evacuation and gas treatment. The additional cover may be provided in the form of a foil casing to prevent the getter powder from being stirred up during further transport. The cover may also serve to prevent the air on the upper side of the bulk getter from being stirred up excessively, and so prevent the accelerated diffusion of the oxygen.

In some embodiments the powder material also functions as an additional external source of the at least one rare-earth element with the high vapor pressure that is contained in the object. This powder material may have a content of the rare-earth element of at least 15 wt % and/or a mean grain size of less than 500 μm.

In some embodiments the powder material has at least one component containing a rare-earth element. The content of the rare-earth element or elements, i.e. at least one of the elements from the group consisting of Sc, Y, La, Ce, Pr, Nd, Pm, Sm, Eu, Gd, Tb, Dy, Ho, Er, Tm, Yb and Lu, may be at least 15 wt %.

For example, the powder material in the gap may contain a rare-earth element with a high vapor pressure. This embodiment can be used with objects that also contain a rare-earth element with a high vapor pressure. The powder material may also contain the same rare-earth element with a high vapor pressure so as to compensate for the evaporation of the rare-earth element from the objects and/or increase the vapor pressure of this rare-earth element in the interior. In turn, this can prevent and/or compensate for the evaporation of the rare-earth element from the objects.

This embodiment can be used in order to simultaneously prevent the penetration of oxygen from the environment into the interior and the escape of rare-earth elements from the interior into the environment, since that part of the powder intended to remove the oxygen and prevent the evaporation of the rare-earth element adjoins the environment or the interior and is thus spatially in the air pathway affected first.

In some embodiments the object contains samarium (Sm) or dysprosium (Dy). These rare-earth elements have a high vapor pressure. The object to be heat treated may be a SmCo alloy or a NdFeB alloy with dysprosium that is heat treated to produce a $Sm_2Co_{17}$- or $Nd_2Fe_{14}B$-type magnet. The elements samarium and dysprosium have an influence on the magnetic properties of the object or magnet and the samarium and dysprosium fractions of the object are therefore controlled to achieve the desired properties. In the case of objects containing samarium or dysprosium, the powder material may be samarium or dysprosium in the form or one or more compounds containing samarium such as samarium hybrid or hybrid dysprosium.

The object may contain a precursor powder containing 2R and 17M, where R is at least one of the elements from the group consisting of Ce, La, Nd, Pr, Sm, Eu, Gd, Tb, Dy, Ho, Er, Tm, Yt, Lu and Y, and M consists of at least one of the elements from the group consisting of Co, Fe, Cu, Zr, Ni, Hf and Ti.

In some embodiments R is only samarium. In some embodiments R is samarium and at least one of the elements from the group consisting of Ce, La, Nd, Pr, Gd, Tb, Dy, Ho, Er, Tm, Yt, Lu and Y.

In some embodiments M contains at least one of the elements from the group consisting of Fe, Cu, Zr, Ni, Hf and Ti in addition to cobalt. In some embodiments 0 wt %≤ Hf≤3 wt %, 0 wt %≤ Ti≤3 wt % and 0 wt %≤ Ni≤10 wt %.

The object may also contain a $Sm_2Co_{17}$-based alloy that contains one of more of the group of elements consisting of Ce, La, Nd, Pr, Gd, Tb, Dy, Ho, Er, Tm, Yt, Lu und Y in addition to samarium and one of more of the group of elements consisting of Fe, Cu, Zr, Ni, Hf und Ti in addition to cobalt. In some embodiments 0 wt %≤ Hf≤3 wt %, 0 wt %≤ Ti≤3 wt %, and 0 wt %≤ Ni≤10 wt %.

BRIEF DESCRIPTION OF THE DRAWINGS

Various embodiments are explained in greater detail below with reference to the drawings.

DETAILED DESCRIPTION OF EXAMPLE EMBODIMENTS

Figure 1A:
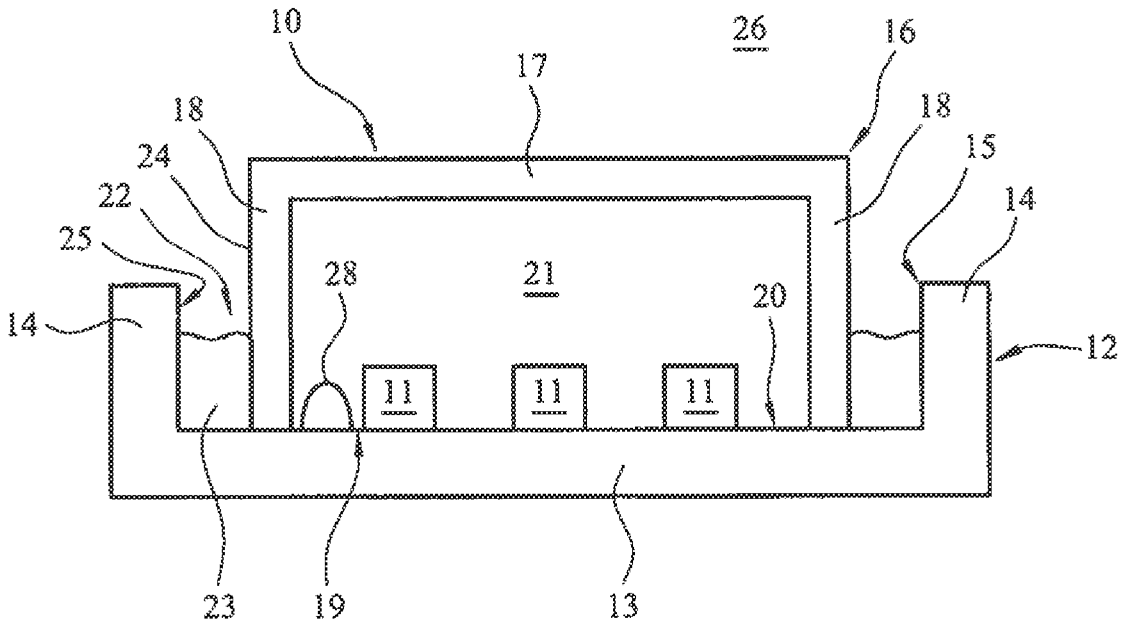
FIG. 1A shows a cross section through an assembly for the heat treatment of an object containing at least one rare-earth element with a high vapor pressure.
Figure 1B:
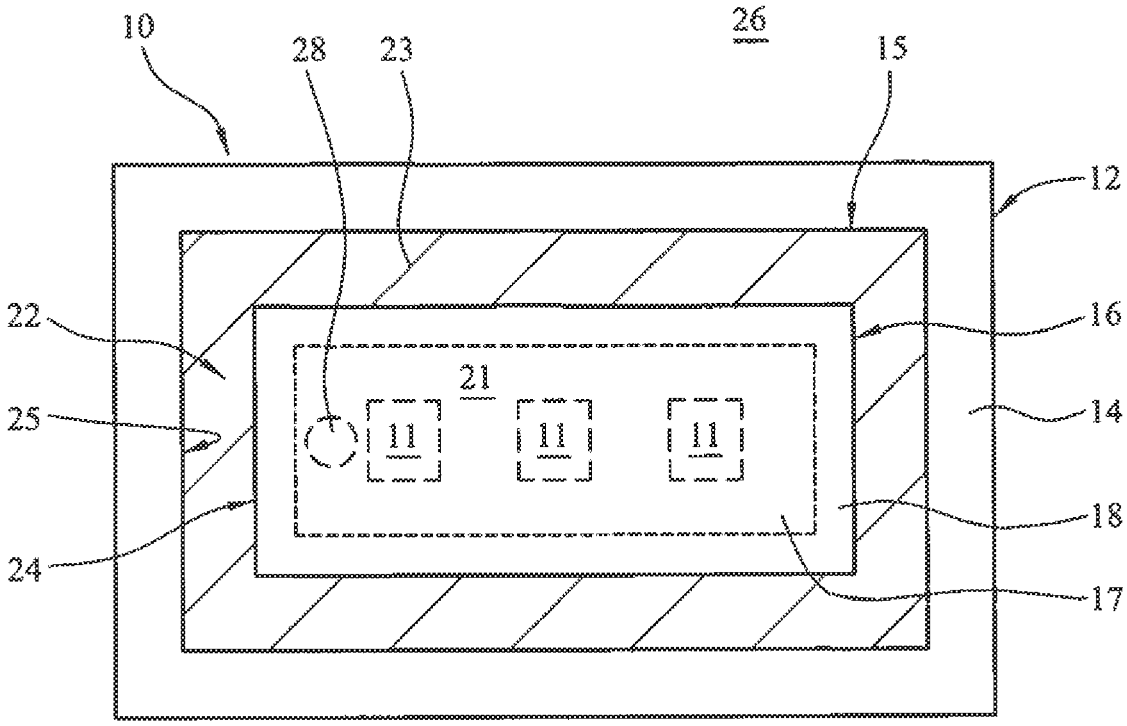
FIG. 1B shows a plan view of the assembly from FIG. 1A.

FIG. 1A shows a cross section through and FIG. 1B shows a plan view of a package 10 for the heat treatment of at least one object 11 that contains at least one rare-earth element with a high vapor pressure. The rare-earth element with the high vapor pressure may be Sm or Dy, Er, Eu or Yb, for example. In the embodiment illustrated in FIG. 1 the package 10 comprises a lower box 12 having a base 13, walls 14 that surround the base 13, and an open side 15. The lower box 12 thus has the form of a trough that is surrounded on the underside and lateral sides by the base 13 and the walls 14 respectively. The package 10 also comprises an upper box 16 having a cover 17 and walls 18 that surround the cover 17, an open side 19 being formed opposite the cover 17.

An additional source 28 of the same rare-earth element with the high vapor pressure is arranged adjacent to the object 11 in the interior 21 of the package 10. In this embodiment this external source 28 of the rare-earth element takes the form of a powder. This additional source 28 serves to compensate for losses due to the evaporation of the rare-earth element from the object 11 during subsequent heat treatment. Before heat treatment, the object 11 has the content of this rare-earth element desired in the finished product. During subsequent heat treatment, this additional source 28 increases the vapor pressure of this rare-earth element in the interior of the package and/or compensates for losses due to evaporation from the object 11. The external source 28 may also be provided in other forms. It is possible, for example, to use an applied layer of powder or an alloy.

The one or more objects 11 are arranged on the upper side 20 of the base 13 of the lower box 12. The one or more objects 11 are then covered with the upper box 16 such that the open side 19 of the upper box 16 faces the base 13 of the lower box 12, the walls 18 are arranged on the upper side 20 of the base 13 of the lower box 12 and the cover 17 of the upper box is arranged above the objects 11. The upper box thus serves as a hood to cover the objects 11. The objects 11 are thus arranged in a closed interior 21 that is surrounded on the lateral sides by the walls 18 of the upper box and closed on the upper side of the cover 17 of the upper box 16 and on the underside of the base 13 of the lower box 12.

A gap 22 is formed between the walls 18 of the upper box 16 and the walls 14 of the lower box 12. In particular, the ring-shaped gap 22 is formed between the outsides 24 of the walls 18 of the upper box 16 and the insides 25 of the walls 14 of the lower box 12.

In some embodiments a powder material 23 is arranged in the gap 22. The powder material 23 provides a mechanical obstacle to gas exchange between the interior 21 and the environment 26 outside the package 10. The powder material 23 is introduced into the gap 22. In some embodiments the upper box 16 is first set on the base 13 of the lower box 14 and the powder material 23 is then introduced into the gap 22. The walls 14 of the lower box 12 serve to hold the powder material 23 inside the package 10 and also to arrange the powder material 23 between the interior 21 and the environment 26. Technically, this means that the air pathway between the interior 21 and the environment 26 is at least partially blocked by the powder material 23. The package 10 is heat treated in this set-up.

The mean grain size of the powder material may also be selected so as to set the density of the powder and the filled fraction of the volume of the gap 22. The mean grain size may be less than 500 μm, for example.

In some embodiments the composition of the powder material 23 or a fraction of the powder material 23 is selected so as to provide an active function such as a getter, e.g. an oxygen getter, as well as the purely mechanical obstacle to gas exchange.

In some embodiments the powder material 23 has different compositions or powders. For example, the powder material 23 may contain an active material as well as a fraction of an inert material. The active material may, for example, be an oxygen getter such as activated carbon, or a metal powder such as aluminium, magnesium or calcium. In some embodiments the grains of the active material and the grains of the inert material are mixed together in the gap 22. In some embodiments, however, the different materials are arranged in the gap 22 in layers.

In some embodiments the powder material 23 contains at least one rare-earth element that is also contained in the object 11 in order to compensate for the evaporation of this same rare-earth element from the object 11 and/or to increase the vapor pressure of this rare-earth element in the interior 21 of the package 10 and so to prevent at least part of the rare-earth element from evaporating from the objects 11. If the powder material 23 contains the same rare-earth element with a high vapor pressure as the object 11, the object can be used instead of or in addition to an external source 28 in the interior 21 of the package 10.

In some embodiments the object 11 contains a SmCo alloy that takes the form either of a green body made of compacted powder of the SmCo alloy or of a pre-sintered object that already contains a $SmCo_{17}$-based alloy. In this embodiment the external source 28 may contain samarium, which may present in the form of a samarium, for example. The composition can be chosen in order to provide the desired vapor pressure with this powder material at the temperatures to be used.

In some embodiments the powder material 23 also contains the rare-earth element with the high vapor pressure and serves as a second external source in order to increase the vapor pressure of the rare-earth element in the interior 21 and/or to compensate for the evaporation of this same rare-earth element from the objects 11. The fraction of the powder material 23 containing the rare-earth element may, for example, be at least 15 wt %.

The lower box 12 and the upper box 16 may be made of molybdenum sheets that are, for example, as thin as possible, e.g. with a wall thickness of no more than 1 mm. The seams between the walls 14 and the base 13, and between the walls 14 themselves, are preferably gas-tight and may be welded. The seams between the walls 18 and between the walls 18 and the cover 17 of the upper box 16 may also be welded and so gas-tight so that the only gas exchange that takes place is via the powder material 23, thereby preventing the evaporation of the rare-earth element in the object 11 and the penetration of undesired elements from the environment 26 into the interior 21.

In a simple embodiment, the lower box 12 and the upper box 16 may be made of iron foil, two foil sheets being bent to form a trough and a hood respectively.

Figure 2A:
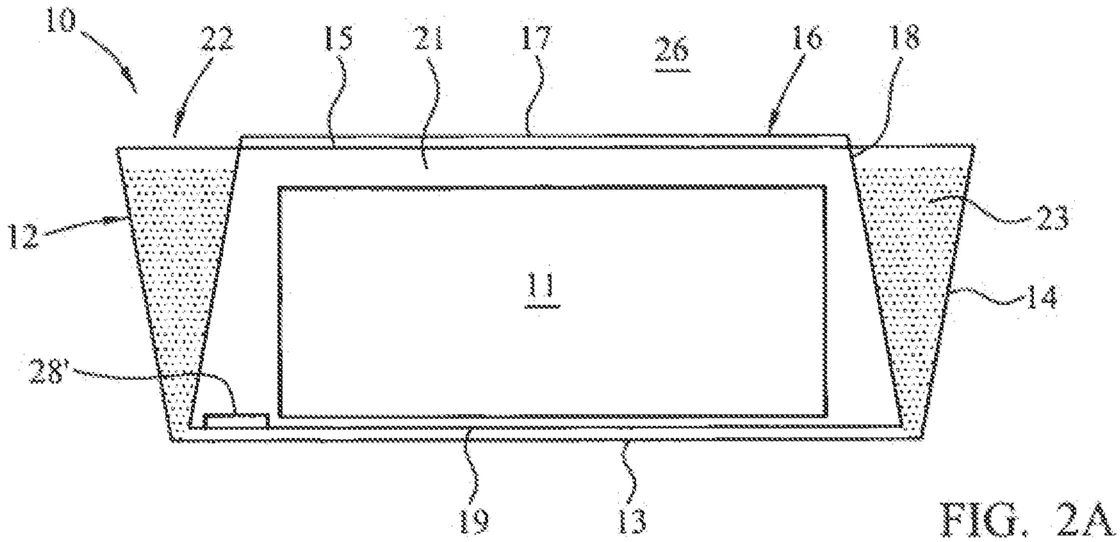
FIG. 2A shows a cross section through an assembly according to an embodiment.
Figure 2B:
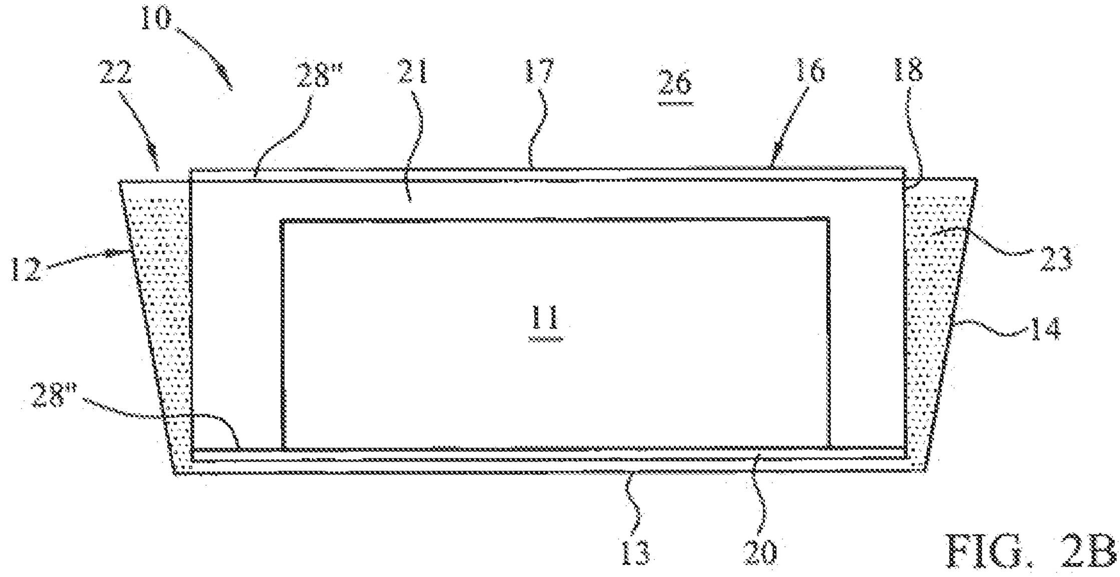
FIG. 2B shows a cross section through an assembly according to an embodiment.
Figure 2C:
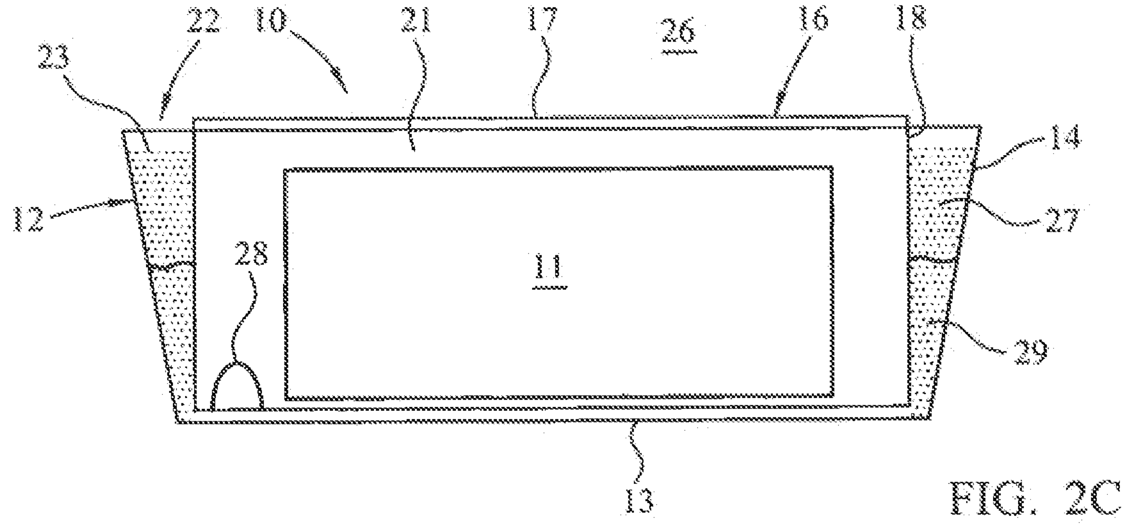
FIG. 2C shows a cross section through an assembly according to an embodiment.

FIGS. 2A to 2C disclose assemblies 10 according to further embodiments. In FIG. 2A both the lower box 12 and the upper box 16 have oblique walls 14, 18 such that the open side 15 of the lower box 12 has a larger area than the base 13. Similarly, the open side 19 of the upper box 16 has a larger area than the cover 17. Consequently, the gap 22 formed between the walls 18 of the upper box 16 and the walls 14 of the lower box 12 is not of regular width and the upper open region of the gap 22 is larger than the lower region. In this embodiment the external source 28' of the rare-earth element takes the form of a layer that is applied to one or more surfaces of the interior 21. This layer can be applied to the surface in the form of a paste by means of dipping, printing or painting. In the case of an object made of a SmCo alloy, a paste containing samarium hybrid may be used.

In the embodiment shown in FIG. 2B, the lower box 12 has walls 14 that extend obliquely outwards, while the walls 18 of the upper box 16 are arranged approximately perpendicular to the cover 17 of the upper box 16 and thus approximately perpendicular to the base 13 of the lower box 12. The gap 22 formed in this assembly is also larger on the open upper side than on the lower side adjacent to the boundary between the base 13 of the lower box 12 and the walls 18 of the upper box 16.

Illustrated in conjunction with this embodiment, is an external source 28" of the rare-earth element in the form of an alloy formed on the surfaces of the interior 21. This layer may be formed by subjecting the boxes 12, 16 to a conditioning process in which the boxes 12, 16 are subjected to the rare-earth element during heat treatment. The material of the boxes 12, 16 is thus able to react with the rare-earth element, thereby forming the alloy containing the rare-earth element on the surface of the boxes 12, 16. For example, a source of the rare-earth element may be arranged in the interior 21 instead of the object 11, and the package 10 may be heat treated so that the rare-earth element evaporates and reacts with the inner surfaces of the walls 18 and the cover 17 of the upper box 16 and with the surface 20 of the base 13 of the lower box 12, where it forms an alloy of the material of the boxes 12, 16 and the rare-earth element. This embodiment may, for example, be used for boxes 12, 16 made of iron and the rare-earth element samarium, an alloy of iron and samarium thus being formed on the surface.

FIG. 2C shows an example of an arrangement in which different powder materials 23 are arranged in layers in the gap 22. The lower layer 29 contains a rare-earth element and the upper layer 27 contains an active material. This embodiment can be used to prevent materials such as oxygen or moisture, for example, from penetrating from the environment 26 into the interior 21. It is, therefore, advantageous for this active material to be arranged immediately adjacent to the boundary with the environment 26 and so in the upper layer 27. At the same time, the evaporation of the rare-earth elements from the objects 11 is prevented by the lower layer in the gap 22 containing the same rare-earth element as the objects 11 and being arranged at the boundary to the interior 21. In this embodiment the external source 28 of the rare-earth element is shown in powder form.

Figure 3:
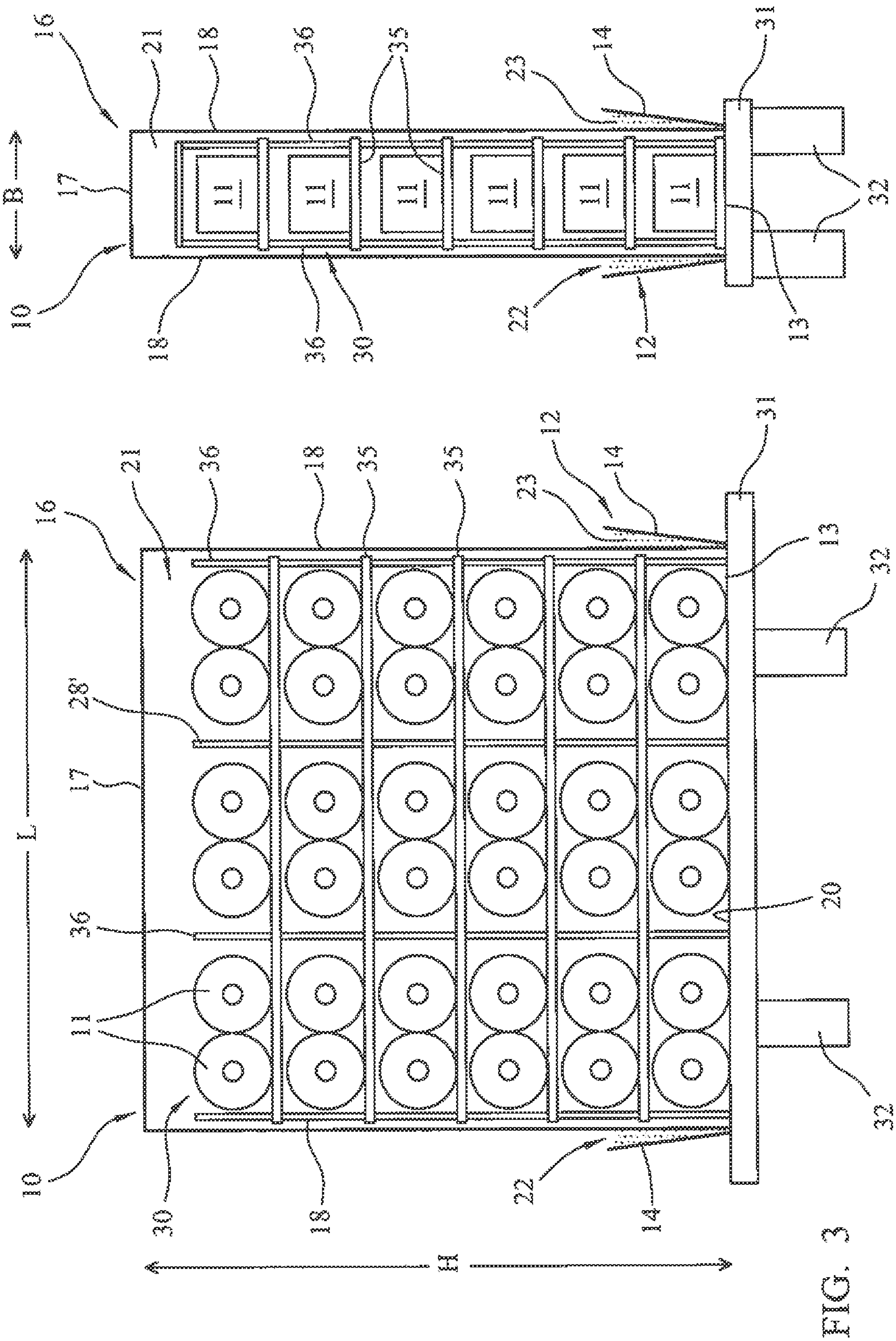
FIG. 3 shows two cross sections through an assembly having a support structure according to an embodiment.
Figure 4:
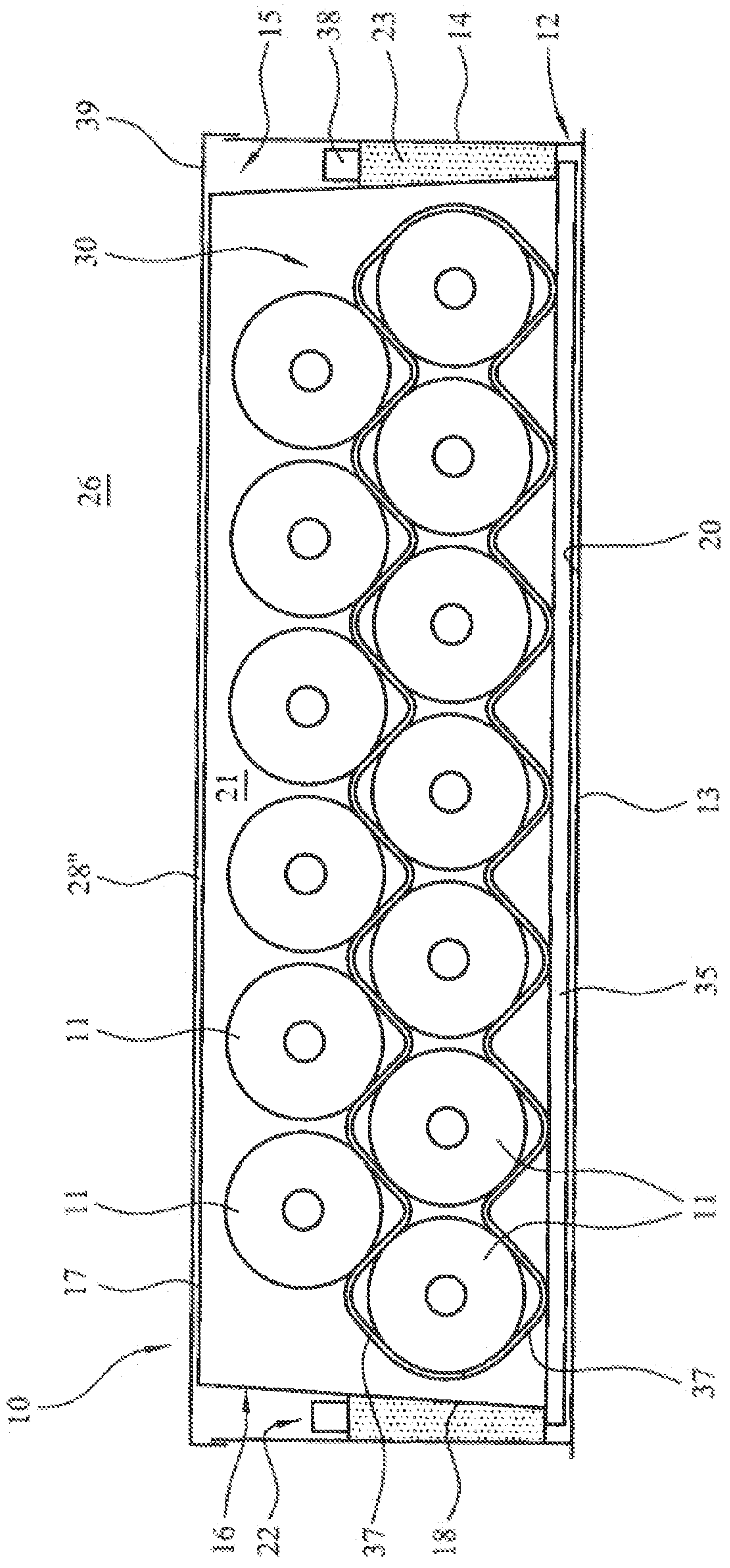
FIG. 4 shows a cross section through an assembly having a support structure according to an embodiment.

The package 10 can be used to heat treat one or more objects 11 simultaneously. To reduce the costs of the production process a plurality of objects 11 is normally heat treated at the same time. To arrange these objects 11 in the interior 21 of the package 10 it is possible to set up a support structure in the interior 21. FIGS. 3 and 4 each show an arrangement having a support structure 30 in or on which the plurality of objects 11 is arranged and then covered with the upper box 16. The powder material 23 is introduced into the gap 22 and the package 10 is then heat treated.

FIG. 3 shows two cross sections through a package 10 having a support structure 30 according to an embodiment. The package 10 may be constructed on a base plate 31, which is then arranged on legs or furnace supports 32. The support structure 30 is arranged on the upper side 20 of the base 13 of the lower box 12

The base plate 31 may be made of CFC. The lower box 12, which can also be described as a trough, and the upper box 16, which can also be described as a hood, may be manufactured from sheets of molybdenum or alloyed high-temperature steel.

The width B of the assembly may be less than the height H and length L of the package 10. This arrangement can be used to increase the cooling rate of the package 10.

The powder material 23 is introduced into the gap 22 that is formed between the outsides of the walls 18 of the upper box 16 and the insides of the walls 14 of the lower box 12.

In this embodiment the support structure 30 takes the form of a plurality of flat plates 35 that are stacked one on top of another and held spaced apart by a plurality of vertical supporting frames 36. A plurality of objects 11 is arranged on the plates 35 between adjacent supporting frames 36 such that the objects 11 are stacked in a plurality of layers inside the interior 21. An external source 28' of the rare-earth element in the form of a layer that is applied by means of a paste to the support structure 30, or at least parts of the support structure 30, may be used.

FIG. 4 shows a cross section through a package 10 having a support structure 30 according to a further embodiment. In this embodiment the support structure 30 consists of a supporting plate 35 on which a corrugated sheet 37 is arranged to take a first layer of objects 11. On this first layer of objects lies a second corrugated sheet 37 on which a second layer of objects 11 is placed. In this embodiment the trough 12 consists of an iron cannister that is open at the top. An external source 28" of the rare-earth element in the form of an alloy formed by conditioning the boxes 12, 16 and/or the support structure 30, or parts of the support structure 30, may be used.

In this arrangement the powder material 23 arranged in the gap 22 between the trough 12 and the hood 16 is covered by a covering frame. The covering frame 38 is thus arranged in the gap 22. Furthermore, the trough 12 is also closed by a cover 39. The cover 39 is crimped to the lower part of the iron cannister 12 once the gap 22 has been filled, producing a stable set-up that is easy to transport.

A package 10 and a support structure 30 according to one of the embodiments described here can be used to produce NdFeB- and SmCo-based permanent magnets and LaFeSi-based magnetocaloric moulded parts. These objects are advantageously producing using powder metallurgy processes in which the starting alloys are first pulverised to form fine powders with a mean particle size of preferably <20 μm and, where necessary, a plurality of such powders is then mixed together to produce a specific composition. These powders are then transformed into the desired forms by a variety of re-forming processes. This may be done by means of compacting with or without a magnetic field, but the powders can also be replaced by organic binders and this mixture then processed further to form sinterable green bodies by means of extrusion, tape casting or similar methods. In addition to the metal powder particles, these green bodies may also contain organic components such as binders, lubricants and dispersing agents, etc. These green bodies then go on to be placed in more or less closed containers in vacuum sinter furnaces, where volatile components such as organic components or hydrogen contained in the starting powders are then pumped off at temperatures below 1000° C. Lastly, the parts are sintered at approx. 1000 to 1200° C. in a vacuum, in hydrogen or possibly in an inert atmosphere depending on the alloy system to produce the desired final density. The finished sintered parts are then generally subjected to various further tempering treatments at lower temperatures in order to create specific material properties.

The package prevents the green bodies from reacting with the air and absorbing impurities such as oxygen, nitrogen and water vapor during transport between the forming state and the sintering furnace or during storage between these two process steps. Moreover, it can also prevent the organic components that are initially expelled at low temperatures and then deposited on cold parts of the sintering furnace from re-diffusing back onto the parts at high temperatures in the sintering furnace and causing undesired carbon contamination. With graphite-insulated furnaces it is possible to prevent the methane that forms due to a reaction of the hydrogen contained in some alloys with the graphite parts from resulting in further carbon contamination of the sinter blanks. Throughout the sinter treatment, the unavoidable leaks in commercial sintering furnaces and impurities contained in the technical inert gases result in the further absorption of oxygen, carbon and nitrogen. Finally, the high vapor pressure of individual rare-earth elements results in the depletion of these elements in the surface of the sinter blanks and so to a loss of quality. This is true, in particular, of the samarium in SmCo magnets, but also to a lesser extent to the dysprosium in NdDyFeB magnets.

This provides a sinter package that, firstly, enables the sintering furnace to be charged with air in the conventional manner without the green bodies made of alloys containing rare-earth elements absorbing significant quantities of oxygen and humidity. Secondly, the sinter package itself can also prevent the further absorption of contaminants such as oxygen, carbon and nitrogen during the sinter treatment. Thirdly, the package can very largely prevent the loss of volatile rare-earth elements such as samarium and dysprosium during the sinter treatment as a result of evaporation at temperatures above 1000° C.

These measures result in an improvement in performance. Moreover, the improved sinter package can obviate the need to acquire costly, fully encapsulated transport systems between the forming stage and the sintering furnace. Finally, and specifically in the case of SmCo magnets, it is also possible using the new sinter package to produce improved qualities that have particularly stringent requirements in terms of rare-earth element content and contamination levels.

In some embodiments the parts to be sintered are first placed centrally in a box-shaped box or sinter box that is open at the top. A second, box-shaped sinter box that is open at the bottom is then placed over the green bodies, the external lateral dimensions of this second box being smaller than the internal lateral dimensions of the first vox. These sinter boxes may be pre-conditioned so as to provide a layer containing the rare-earth element with the high vapor pressure on the surface located in the interior. Alternatively or in addition, an additional source of the rare-earth element may be arranged in the interior. This arrangement results in a gap between the two boxes into which a powder material is then introduced. In the simplest case, this is an inert powder that simply obstructs gas exchange between the inner and outer layers of the sinter package. However, the use of active powders such as activated carbon or fine metal powders such as aluminium, magnesium and calcium, for example, as used as getter materials in vacuum and pipe technology, is also conceivable. Getter powders with a rare-earth element content of >15 wt % and a grain size of <500 μm are particularly suitable for the production of sinter blanks containing rare-earth elements. A combination of various different powders is also possible, e.g. samarium hybrid to compensate for evaporation at the bottom and a metal oxide to reduce gas exchange at the top.

Both boxes are fully gas-tight apart from the missing cover or base area, respectively. This ensures that the only gas exchange between the inside of the sinter package and the environment takes place by means of gas diffusion through the getter bed. Due to the high reactivity of the getter powder containing the rare-earth element, impurities are effectively bound by oxygen, water vapor, nitrogen and carbon-containing gases. At the same time, the loose filling of getter powder permits the evacuation of the box required for the exchange of process gases such as hydrogen and argon. When sintering alloys containing samarium or dysprosium, the getter powder preferably contains samarium or dysprosium. In addition to the getter effect, these elements in the getter bed result in an increased vapor pressure that effectively counters the evaporation of these elements from the surface of the sinter blanks.

First, a separating agent intended to prevent the parts from sintering together during heat treatment is optionally scattered on the base of the first lower box. The parts to be sintered are then placed on this separating agent and covered with the second box that is open at the bottom. The powder material can then be poured onto the inner box, from where it can be distributed comfortably in the gap. There are no major requirements here in terms of the fit between the two boxes as they are substantially sealed by the bulk powder. The powder can also be pressed into the gap using a suitable tool in order to prevent cavities in the bulk getter. The getter powder can also be bedded in with a suitable inert solvent, which can then be pumped out again before sintering. To prevent the getter powder from being stirred up during transport, evacuation and gas treatment, the entire set-up can also be covered with a cover. The paragraphs below described a series of preferred embodiments.

In a simple case the two boxes are each folded from a piece of iron foil. This technique, in which the foil is used only once, is suitable for packaging large blocks weighing in excess of 5 kg. First, two foil boxes, which are open at the top and larger in periphery than the green body, are folded. The larger of the two forms is then placed over the green body, which sits in a glove box filled with inert gas. The green body together with the foil casing is then rolled further by 180° about its longitudinal axis so as to lie approximately centrally in the open foil casing, which is then open at the top. The smaller foil casing is then placed over the green body from above and the gap between the two casings is filled with the getter powder. In principle, this charge set-up can be transported to the sintering furnace as is. Alternatively, however, the set-up can also be covered with a further foil casing in order to prevent any spillage of getter powder during further transport and to prevent the air on the upper side of the bulk getter from being stirred up excessively, and so prevent the accelerated diffusion of the oxygen.

Instead of the single-use iron foil, it is also possible to make the sinter boxes from a solid steel sheet by welding together sheets of approx. 3 mm thickness. High-temperature-resistant steels, in particular, such as austenitic steel 1.4841, for example, are suitable here. There should also be a peripheral gap between the inner cover and the outer box, which is then filled with the getter powder. The advantage of a set-up of this type is that it can be used multiple times and that the pot-shaped base simultaneously serves as a dimensionally stable support for the green bodies.

Even high-temperature-resistant steels tend to distort at temperatures of 1000 to 1200° C. and the sinter boxes can therefore only be reused under certain conditions. These sinter boxes, which are open on one side, can therefore preferably also be made of molybdenum. Although molybdenum is more expensive, it also remains dimensionally stable at high temperatures and can therefore be reused multiple times. In particular, the surface on which the sinter blanks are placed also remains flat, thereby minimising distortion due to sintering. In the case of alloys containing samarium and dysprosium, molybdenum has the further advantages that it does not react with the samarium and dysprosium vapor and also acts as a mirror.

Iron and steels form intermetallic compounds with the rare-earth element vapor, thereby acting as a sink for the samarium and dysprosium and causing the undesired loss of rare-earth elements at the surface of the sinter blanks. These materials can be pre-conditioned in order to provide an additional source of samarium for subsequent heat treatments and so prevent the loss of the rare-earth element from the objects. The quantity of the additional source can be chosen with regard to the material of the package to ensure that the object has the desired composition after heat treatment.

The side walls of the sinter packaging may preferably be inclined towards one another such that the resulting gap for the getter powder is wider at the top than at the bottom. This makes it easier to introduce the getter powder and requires less getter powder to achieve the same fill level. The external dimensions selected for the inner box at the lower end of the gap are almost as big as the internal dimensions of the outer box. This simplifies the positioning of the inner box, which practically centres itself. A wedge-shaped cross section of the gap has a further advantage. If the getter powder starts to shrink during the sinter treatment itself, part of the getter cake that forms may slip downwards and so prevent the formation of an unwanted gap between the getter and the sinter boxes during sintering.

Where requirements in terms of the cleanliness of the handling and sintering atmosphere are particularly strict, a plurality of sinter boxes or boxes may also be arranged one on top of another. A number of different types may also be combined. For example, SmCo green bodies that are particularly sensitive to samarium evaporation can first be packed into an inner double box made of molybdenum and then into a more cost-effective, secondary package. Since the second, outer package is not in direct contact with the sinter blanks, cost-effective, dimensionally stable materials such as graphite, for example, which would otherwise react with the sinter blanks, can be used. It is, of course, necessary to ensure that the outer getter material does not react with the material of the outer package.

The inner sinter boxes may be taller than the associated outer sinter boxes. This facilitates the removal of the inner box after sintering. Alternatively, eyes or lugs may also be attached to the inner sinter box and grasped with the aid of an appropriate tool in order to open the sinter box.

The set-up with the boxes and the powder material in the gap may be covered by a further hood. This hood may be a simple thin iron foil (single-use packaging) but may also be a more solid reusable hood. This covering hood prevents the powder from being stirred up during transport and heat treatment and so helps to maintain the activity of the material. This cover need not be a fully closed hood; it may simply be a ring-shaped frame that covers the gap containing the powder.

The height of the powder introduced into the gap may be selected so as to achieve a desired getter effect since if the bulk powder level is lower there is a risk that the getter will not work sufficiently effectively.

Before transporting the filled sintering container, nitrogen—the inert gas usually used when handling green bodies—may preferably be replaced by argon. For example, the container complete with the green body and powder can be evacuated in a lock and then flooded with argon. As argon is heavier than air, the diffusion of oxygen into the powder bed is further slowed and the activity of the getter is better retained for the actual sinter treatment.

The powder introduced into the gap may be an inert material such as $SiO_2$, $Al_2O_3$ or a rare-earth oxide, for example. Where this is the case, the powder simply functions as a diffusion barrier to gas exchange. The powder may also preferably consist of activated carbon or fine metal powders such as Al, Mg, Zr, Ti or even Ca, for example, as used in vacuum and pipe technology. In such cases, the powder acts as an active getter and binds impurities as they flow through it. The getter powder itself preferably has a rare-earth content of at least 15 wt % and a grain size of <500 μm. In principle, all rare-earth elements La, Ce, Pr, Nd, Pm, Sm, Eu, Gd, Tb, Dy, Ho, Er, Tm, Yb and Lu, including Y, are suitable.

The getter powder may preferably have a mean particle size of >50 μm. This reduces the sinter activity of the getter powder, and so reduces the risk of the two sinter boxes being sintered together by the getter powder and it being impossible to separate from one the other easily after the sinter treatment. The getter powder may preferably have a fraction of >50% with a particle size of <10 μm. This fraction of fine material considerably increases the reactivity of the getter and so improves the getter effect. The particle size and composition of the getter powder may be set such that it sinters itself to a sealed porosity during the sinter treatment, slips down the oblique side wall shown in FIG. 2A and connects the two sinter boxes tightly to one another. The getter powders may preferably have the same composition as the parts to be sintered. This means that the coarse powders and mixtures available in the process can be used as they are with the pulverised fine powders. The filter dusts occurring during pulverisation of the fine powder can also be mixed into the getter powders. The getter powders may preferably be produced by pulverising defective sintered parts. It is, however, important that these defective parts be free of organic residues and not subject to excessive oxidisation. Getter powders already used in past sinter treatments can also preferably be pulverised to produce getter powders. Pulverising creates fresh surfaces and so reactivates the getter powders.

These powders are preferably only reused as getter powders if the rare-earth-element content (SE) satisfies the following equation:

$$SE > 15\ \text{wt}\ \% + \text{sum}(\text{O} + \text{C} + N) * 10,$$

where O, C and N are the oxygen, carbon and nitrogen contents in wt %.

The getter powder may preferably consist of a mixture of two components with different rare-earth-element contents. For example, one component may contain an intermetallic phase such as $Nd_2Fe_{14}B$, $Sm_2Co_{17}$, $Sm_2Fe_{17}$, $SmCo_5$ or (La, Ce)(Fe, $Si)_{13}$, for example, while the second component consists of rare-earth hybrids such as $NdH_2$, $DyH_2$, $SmH_2$ or $LaH_2$, for example. At the sintering temperatures used, the intermetallic phases continue to form a stable framework while the components richer in rare-earth elements provide a better getter effect owing to their greater reactivity.

Recycled getter powders that no longer satisfy this condition may preferably be sufficiently reactivated by the addition of a component rich in rare-earth elements.

Certain examples are described below.

Test Series 1

In a first test series, samples of a $Sm_2Co_{17}$-based alloy are produced with a conditioned iron package. Comparison samples made of an $Sm_2Co_{17}$-based alloy are produced with a new, non-conditioned iron package. First, a body is formed. It can be formed by compacting a precursor powder containing 2R and 17M, where R is at least one of the elements from the group consisting of Ce, La, Nd, Pr, Sm, Eu, Gd, Tb, Dy, Ho, Er, Tm, Yt, Lu and Y, and M contains Co, Fe, Cu and Zr.

Three compositions (referred to as 3, 4 and 5) are examined. Powder 3 has a samarium content of 24.9 wt %, powder 4 a samarium content of 24.85 wt % and powder 5 a samarium content of 25.25 wt %. The three powders each contain approx. 19% Fe, 5% Cu and 2.6% Zr.

The samples are formed by compacting a starting powder, then packing them in a package and heat treating them. The package consists of a lower plate on which the samples are arranged, a frame arranged on the lower plate and surrounding the samples, and an upper plate arranged on the frame. This assembly is encased in a cannister made of a sheet of foil. The plates, frame and foil are made of iron. This package is subjected to heat treatment in order to sinter the samples.

The samples are first sintered, followed by alternating homogenisation, cooled rapidly with compressed air, then tempered and cooled slowly. The initial sinter treatment is carried out at a temperature Ts, which is the highest temperature to which the body is exposed. An alternating or repeating cycle is used for the subsequent homogenisation in line with the principles disclosed in DE 10 2020 113 223 A1.

The phase diagram of the $Sm_2Co_{17}$-based alloy is used to explain the alternating or repeating cycle for the subsequent homogenisation. As the temperature decreases, the phase diagram of the $Sm_2Co_{17}$-based alloy exhibits a liquid region, a first phase field PH1, a second phase field PH2 and a third phase field PH3. The phase diagram has a first boundary B1 between the first phase field PH1 and the second phase field PH2, and a second boundary B2 between the second phase field and the third phase field. The first phase field PH1 has a liquid phase and at least one solid phase in equilibrium, the at least one solid phase being a 2-17 ($R_2M_{17}$) phase. The second phase field PH2 has a solid majority phase with a phase fraction of more than 95%, the solid majority phase being the 2-17 ($R_2M_{17}$) phase. The third phase field PH3 has at least two solid phases of different composition in equilibrium. The at least two solid phases exhibit the 2-17 ($R_2M_{17}$) phase, a 1-5 phase and a Zr-rich phase. The phase diagram also contains a liquidus line L at temperatures above the first phase field PH1, liquid phases only being present above the liquidus line L.

One or both of the first boundaries B1 between the first phase field PH1 and the second phase field PH2 and of the second boundary B2 between the second phase field PH2 and the third phase field PH3 are crossed at least twice in one cycle in order to perform an alternating repeating cycle for homogenisation.

In the first test series the iron package is conditioned by heat treating a samarium source in the package, thereby forming an alloy of samarium and iron on the inner surfaces of the package. For example, the heat treatment used to condition the package may be the same as that used in the production of the SmCo magnets. The influence of the conditioning of the iron package was examined by measuring the open remanence $J_r'$ of the samples after heat treatment and using the package or parts of the package a plurality of times. For practical applications, a $J_r'$ of at least 1.0 T, or even better 1.1 T, at an inner counter field strength of 400 kA/m is desirable.

Figure 5:
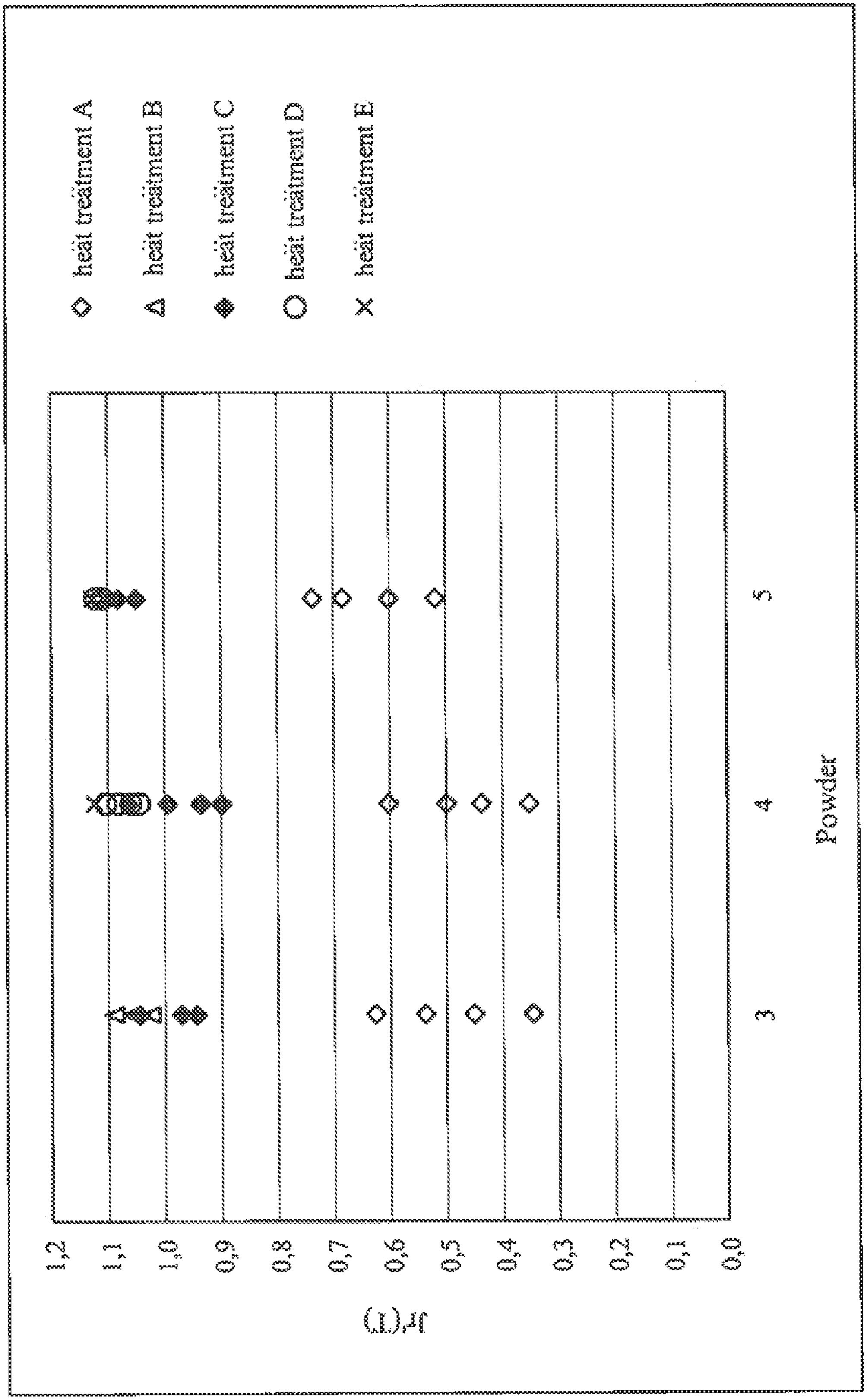
FIG. 5 shows a diagram of open polarisation $J_r'(T)$ for samples produced using a conditioned iron package.

FIG. 5 shows a diagram of the open polarisation $J_r'$ for samples made of a $Sm_2Co_{17}$-based alloy produced with a conditioned iron package and with a new, non-conditioned iron package respectively.

Series A contains samples that are heat treated in a package in which the frame and cannister were new and only the plates had already been used. As shown in FIG. 5, these samples have the lowest $J_r'$ value. For series B, the package from series A was reused. The package from series A is thus pre-conditioned since the iron has already reacted with samarium and an alloy has been formed on the inside of the package and can serve as a samarium source during the subsequent heat treatment(s). As shown in FIG. 5, the samples in series B have a clearly higher $J_r'$ value. Subsequent heat treatments C to E with reused package are also at this higher $J_r'$ level.

Test Series 2

In the second test series an external source of samarium in the form of a separate object is examined. A new, i.e. non-preconditioned, package was used for each heat treatment. A paste of samarium hybrid was used. It was applied to the inside of the frame. The quantity of samarium hybrid applied was set. Samples 1 to 5 comprising powder 4 and samples 6 to 10 comprising powder 5 were produced and then heat treated in separate frames in an iron cannister. The samples were first sintered, then subjected to alternating homogenisation and tempering.

Figure 6:
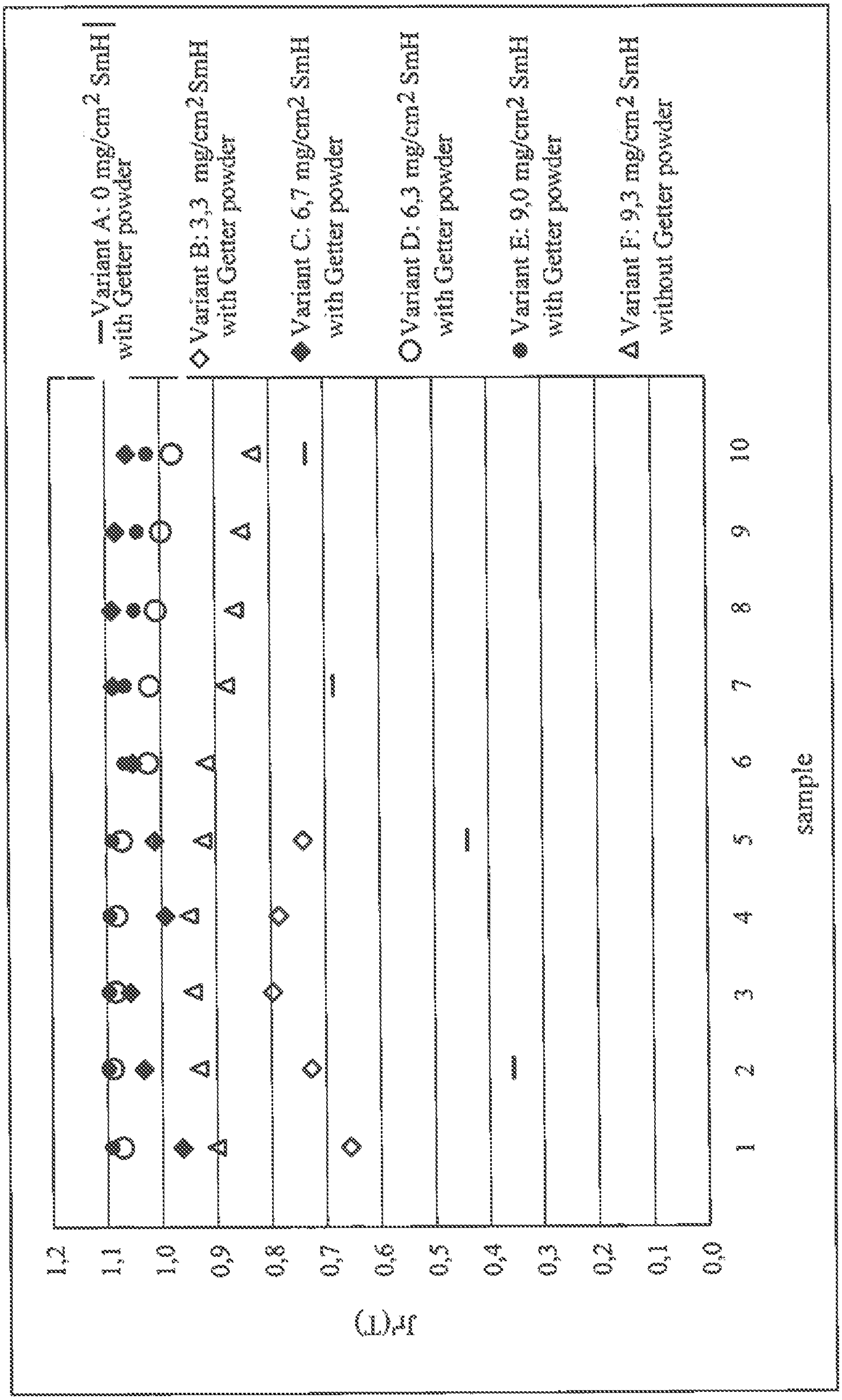
FIG. 6 shows a graph of $J_r'$ (T) for samples that have been heat treated with and without an additional external source of samarium hybrid in the package.

FIG. 6 shows a graph of $J_r'$ for the samples and for comparison samples heat treated without an additional source of samarium in the package. As can be seen in FIG. 6, the comparison samples of variant A without samarium hybrid have the lowest $J_r'$ values. An increase in $J_r'$ was established for both compositions when the smallest amounts of samarium hybrid were used. $J_r'$ is increased further when the quantity of samarium hybrid is also increased. FIG. 6 shows that variant B, which has a samarium hybrid application quantity of 3.3 mg/cm$^2$ iron frame area (corresponding to approx. 0.3 wt % samarium hybrid based on the total amount of magnet material used per packaging unit of 85 g=17 g/part*5 parts/packaging unit) from samples made from the Sm-poorer powder 4 (samples 1 to 5), fails to achieve a sufficient improvement in $J_r'$ values compared to the reference without samarium hybrid. In the samples made of the Sm-richer powder 5 (samples 6 to 10), however, just this small quantity is sufficient to achieve a significant improvement. An increased application quantity of approx. 6 to 9 mg/cm$^2$ (approx. 0.6 to 0.8 wt % samarium hybrid based on the magnet material) results in a clear improvement in $J_r'$ values for both compositions.

The influence of a getter powder in the package was also examined. In variants A to E, a fine powder corresponding in terms of chemical composition to the magnet material was introduced between the walls of a double-walled package and served as the getter. Comparison samples of variant F were heat treated without this getter and with the highest quantity of samarium hybrid as an additional external source. The $J_r'$ values for variant F are lower than those for variants C to D and show that the combination of an additional source of the rare-earth element with the high vapor pressure and a getter result in the best $J_r'$ values.

Test Series 3

Figure 7:
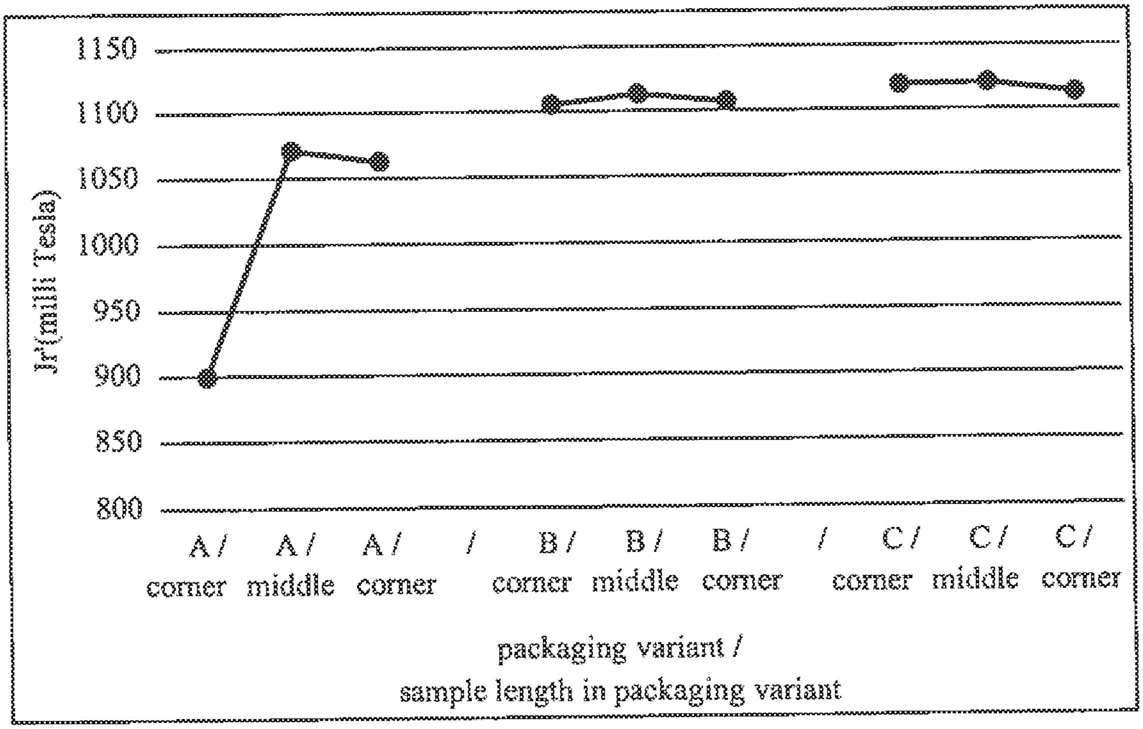
FIG. 7 shows a graph of $J_r'$ (T) for samples that have been sintered in three different packages.

FIG. 7 shows the influence of three exemplary sinter package variants A, B and C on the $J_r'$ values measured after heat treatment, as measured at two corner and one central sample for each package variant.

With package variant A the samples to be sintered were packed in a new sealed iron cannister. New iron framelets that had been neither conditioned nor printed with samarium hybrid paste were placed in the interior of the cannister. The corner samples, in particular, show comparatively poor $J_r'$ values.

With package variant B the samples were also packed in a new sealed iron cannister, but the framelets were printed with 15.7 mg/cm$^2$ samarium hybrid. This corresponds to a total quantity of approx. 7.2 g samarium hybrid in the packaging unit or 0.15 wt % based on 25 pressed parts per packaging unit, each with a weight of approx. 192 g. This gives a considerable improvement in $J_r'$ values, in particular for corner samples, with equally good $J_r'$ values being achieved for all three samples measured.

With package variant C the framelets were also printed with samarium hybrid, as for package variant B but, instead of a new iron cannister, a foil package with getter in the gap formed between the frame and the cannister was used. The getter consisted of a 1:1 mixture of coarse and fine $SmCo_5$ powder. Variant C also results in a considerable improvement in $J_r'$ values as compared to variant A. In this case, the $J_r'$ values achieved slightly exceeded those for variant B and were very consistent.

In further embodiments iron packages were conditioned by sintering SmCo green bodies in box-shaped iron packages, all the surfaces of the package directly facing the sinter blanks being exposed to a samarium atmosphere at a temperature of at least 1100° C. at least once for at least one hour. The annealing of the iron parts in a samarium atmosphere results in the formation of layer of a SmFe alloy layer with a samarium vapor pressure comparable with that of the SmCo magnets.

In some embodiments the conditioning of the iron parts is carried out by filling the package with sacrificial SmCo parts, e.g. defective parts, and subjecting them to a full sinter cycle. This ensures that the surface of the iron parts is exposed to exactly the same samarium vapor conditions as during the sintering of good parts during actual sintering. The conditioned iron parts can be used multiple times. To this end, they are preferably cleaned of loose adhering material and, where necessary, aligned mechanically to compensate for any distortion occurring during sintering.

In some embodiments the charge set-up may consist of a conditioned base plate made of iron on which iron framelets, also conditioned, are set. The SmCo green bodies are then placed on the plate and the set-up is covered with a further conditioned covering plate made of iron. A further similar layer of green bodies and conditioned framelets and a further covering plate can then be placed on this set-up. It is thus possible to construct set-ups with more than two layers.

These set-ups can also be placed in an outer sintering container made of iron. This additional container may consist of a thin-walled iron sheet or foil and need not be conditioned since it is not in direct eye contact with the SmCo sinter blanks. This outer container serves to protect the parts from oxidation and the set-up from damage during handling.

In some embodiments the iron parts may also be coated with a Sm-rich alloy powder with a samarium content of at least 15 wt %. A samarium hybrid powder with a mean particle size of <50 μm makes a suitable Sm-rich alloy powder. The samarium hybrid powder can be applied to the iron parts in the form of a paste by means of dipping, printing or painting. The samarium hybrid paste can only be applied to the side of the iron parts forming the sinter package facing the sinter blanks. The total quantity of samarium hybrid paste applies is between 0.05 and 1 wt % based on the total quality of SmCo green bodies in the sinter package. This figure is particularly preferably 0.1 to 0.2 wt %

The embodiments may also be combined with one another in any way. For example, the SmCo green bodies may be placed on reusable, relatively thick conditioned iron plates, framelets made of unconditioned, relatively thin iron sheet printed with 0.15 wt % samarium hybrid (converted value) may be placed around them and the entire set-up may be closed with a conditioned, reusable iron plate. This set-up is then preferably packed into a thin-walled iron cannister.

In an embodiment the SmCo green bodies are placed directly on a conditioned, reusable thick iron plate, which is then placed in a cannister made of iron sheet, the inside of the iron cannister being printed with 0.15 wt % samarium hybrid, for example.

In an embodiment a thick conditioned reusable iron plate may be placed in a trough made of thin iron sheet. The SmCo green bodies are then placed on this plate and covered with a hood made of thin iron foil with samarium hybrid printed on the inside. A getter powder is introduced into the gap between the inner iron hood and the outer trough and then covered by a ring-shaped part and sealed. The entire set-up is then closed with a cover made of thin iron sheet.

Figure 8:
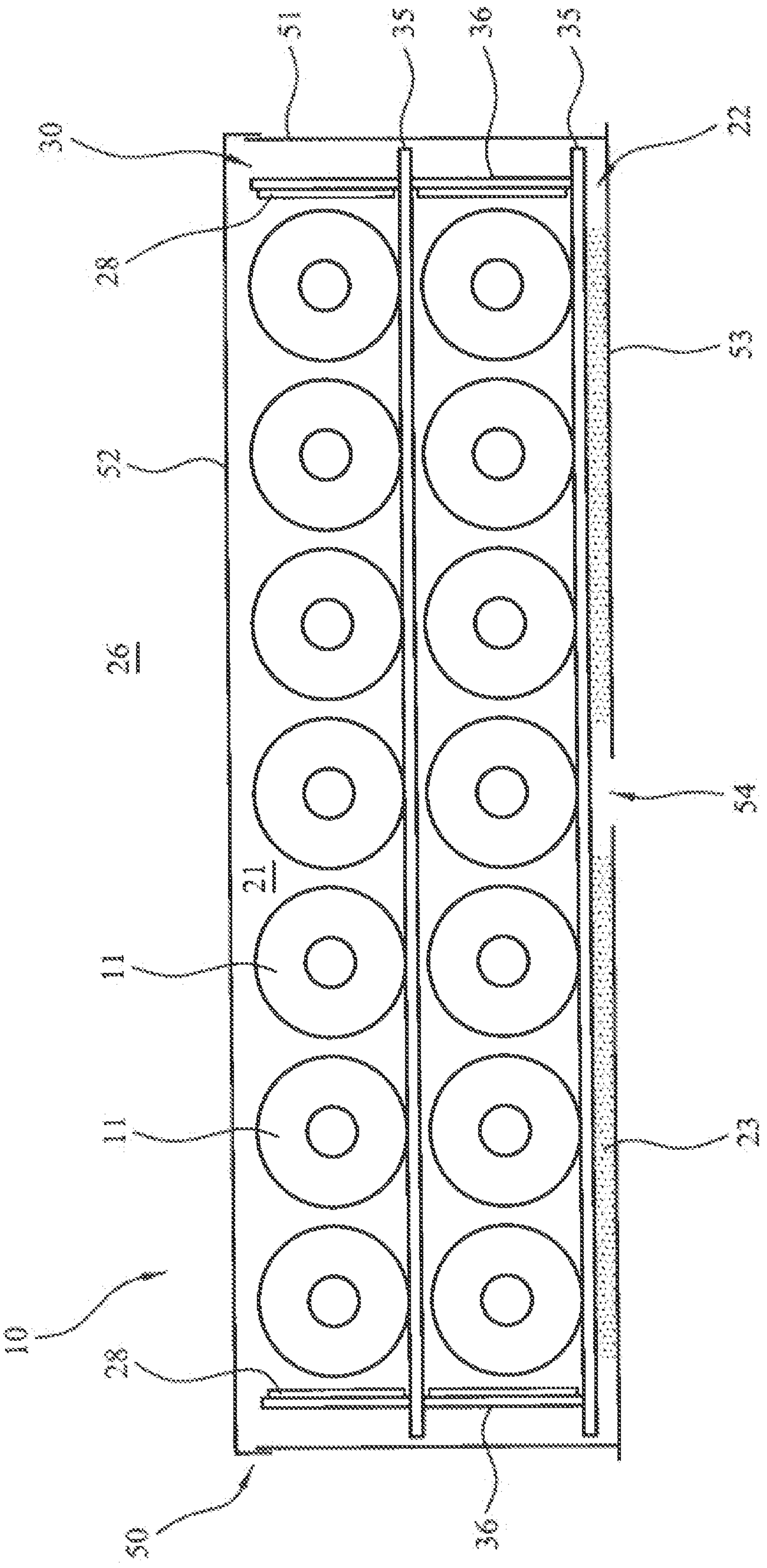
FIG. 8 shows a cross section through an assembly having a support structure according to an embodiment.

FIG. 8 shows a cross section through an assembly 10 having a support structure 30 according to a further embodiment. In this embodiment, as in the embodiment in FIG. 3, the support structure 30 consists of supporting plates 35 and supporting frames 36. At the same time, the undermost supporting plate 35 performs the function of the trough 12 in the assembly shown in FIG. 1 by forming, together with the cannister base 53, the gap 22 for receiving the getter 23. In this arrangement, the cannister base 53 is connected to the cannister wall 51 and the cannister cover 52 in a gas-tight manner such as by welding, for example. Together, the cannister wall 51, the cannister cover 52 and the cannister base 53 form a cannister 50 that corresponds to the hood 16 in FIG. 1. The cannister base 53 has a hole the enables gas exchange between the interior 21 and the exterior 26. In this embodiment the hole 54 corresponds to the opening 15 in the trough 12 in FIG. 1.

The gas exchange now between the sintered parts 11 in the interior 21 and the exterior 26 takes place through this hole 54, the gas having to flow through the getter 23 since the outer can 50 is closed in a gas-tight manner by welding, crimping or soldering, for example. In this embodiment at least the gas-tight connection between the cannister cover 52 and the cannister wall 51 must be made after the cannister has been filled with the sintered parts.

In this embodiment the sintered parts consist of a $Sm_2Co_{17}$ alloy. To compensate for the samarium loss by evaporation, the supporting frames 36 are printed with a samarium hybrid paste provided by the external source 28. Here, the total quantity of samarium in the paste is approx. 0.15 wt % based on the total weight of the sintered parts 11.

What is claimed is:

1. A method for heat treating an object, the method comprising the following:

providing a package comprising a plate, a box having a base and walls that surround the base, and a cover, wherein the base has a hole and the box comprises iron foil and/or the plate comprises an iron plate;

placing a powder material onto the base of the box;

arranging the plate on the powder material on the base of the box;

arranging one or more objects on the plate, wherein the one or more objects include at least one of Sm, Dy, Er, Eu, and Yb;

arranging an external source of the at least one of Sm, Dy, Er, Eu, and Yb within the box, the external source being provided by an alloy of iron and the at least one of Sm, Dy, Er, Eu, and Yb;

placing the cover on the walls, thus forming an interior volume;

wherein the powder material provides a mechanical obstacle to gas exchange between the interior volume and an environment outside of the interior volume of the package; and heat treating the package.

2. A method according to claim 1, wherein the one or more objects comprises an SmCo alloy that is heat treated in order to produce a $Sm_2Co_{17}$- or $Sm_1Co_5$-type magnet.

3. A method according to claim 1, wherein the package is subjected to heat treatment at a temperature above 1000° C.

4. A method according to claim 1, wherein the external source comprises at least 0.04 wt % of the at least one of Sm, Dy, Er, Eu, and Yb, based on the total weight of the one or more objects.

5. A method according to claim 1, wherein a layer of powder comprising the at least one of Sm, Dy, Er, Eu, and Yb is applied to an inside of the package.

6. A method according to claim 1, wherein the external source comprises samarium hybrid.

7. A method according to claim 1, wherein the alloy of iron and the at least one of Sm, Dy, Er, Eu, and Yb is formed on the surface of the iron foil and/or iron plate by heat treating the iron foil and/or the iron plate in an atmosphere containing the at least one of Sm, Dy, Er, Eu, and Yb.

8. A method according to claim 1, wherein the package further comprises a support structure for the one or more objects, wherein the support structure is placed on the plate and the one or more objects are arranged in the support structure.

9. A method according to claim 8, wherein the support structure comprises iron and the external source is provided on the surface of the support structure by an alloy of iron and the at least one of Sm, Dy, Er, Eu, and Yb that is formed by heat treating the support structure in an atmosphere containing the at least one of Sm, Dy, Er, Eu, and Yb.

10. A method according to claim 8, wherein a layer of a powder comprising the at least one of Sm, Dy, Er, Eu, and Yb is applied to the support structure.

11. A method according to claim 1, wherein the powder material is an additional external source of the at least one of Sm, Dy, Er, Eu, and Yb that is contained in the one or more objects.

12. A method according to claim 11, wherein the powder material comprises a content of the at least one of Sm, Dy, Er, Eu, and Yb of at least 15 wt %.

13. A method according to claim 1, wherein the powder material is made up of different powder materials.

14. A method according to claim 13, wherein the powder material comprises the external source of the at least one of Sm, Dy, Er, Eu, and Yb and an active material.

15. A method according to claim 14, wherein the powder material comprises a lower layer comprising the at least one of Sm, Dy, Er, Eu, and Yb, and an upper layer comprising an active material.

16. A method according to claim 15, wherein the active material is an oxygen getter.

17. A method according to claim 1, wherein the cover is fastened to the walls of the box in a gas-tight manner.

18. A method according to claim 1, wherein the external source is formed on the plate and/or on the inside of the box and/or on the cover.

* * * * *